No. 751,018. PATENTED FEB. 2, 1904.
F. A. SELLEY.
WEIGHING SCALE.
APPLICATION FILED JUNE 29, 1903.
NO MODEL. 3 SHEETS—SHEET 2.
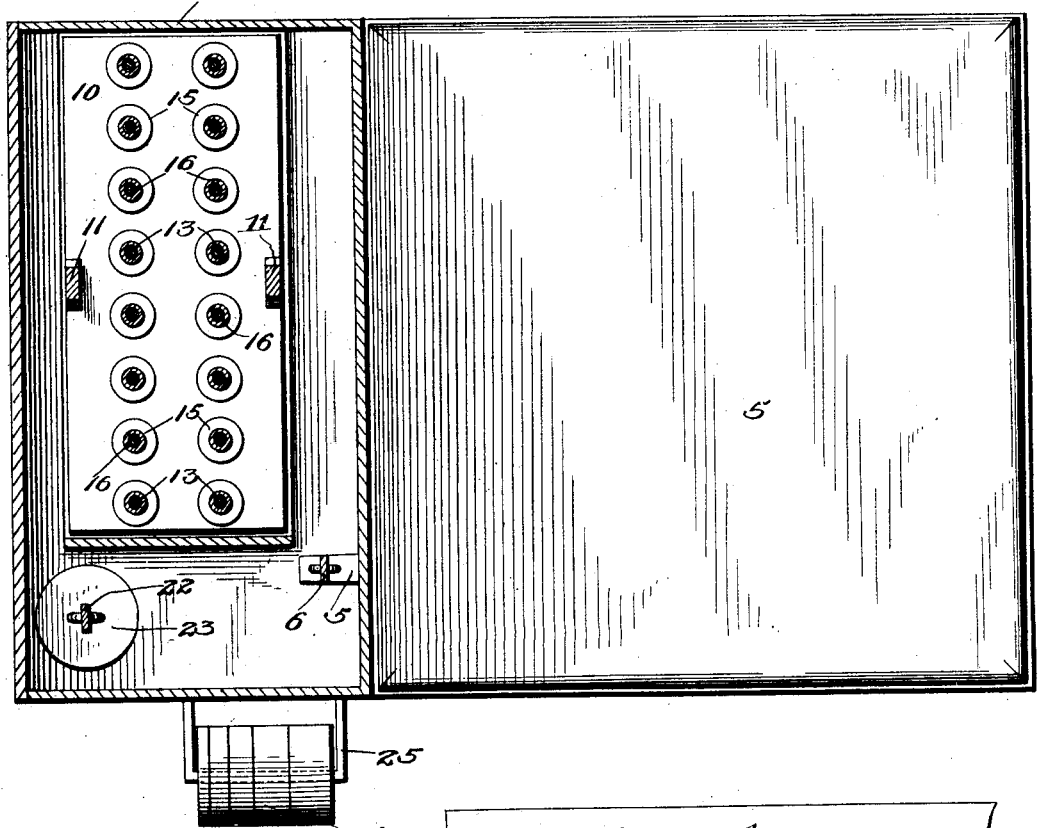
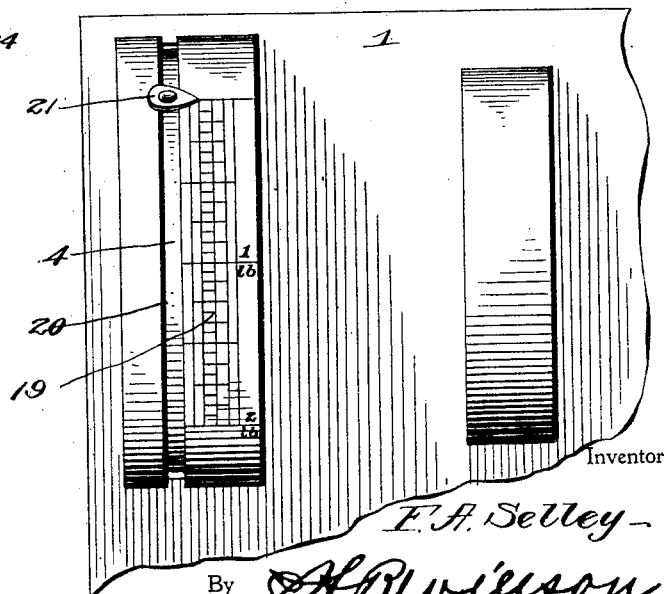
Witnesses
Inventor
F. A. Selley
By H. B. Wilson
Attorney

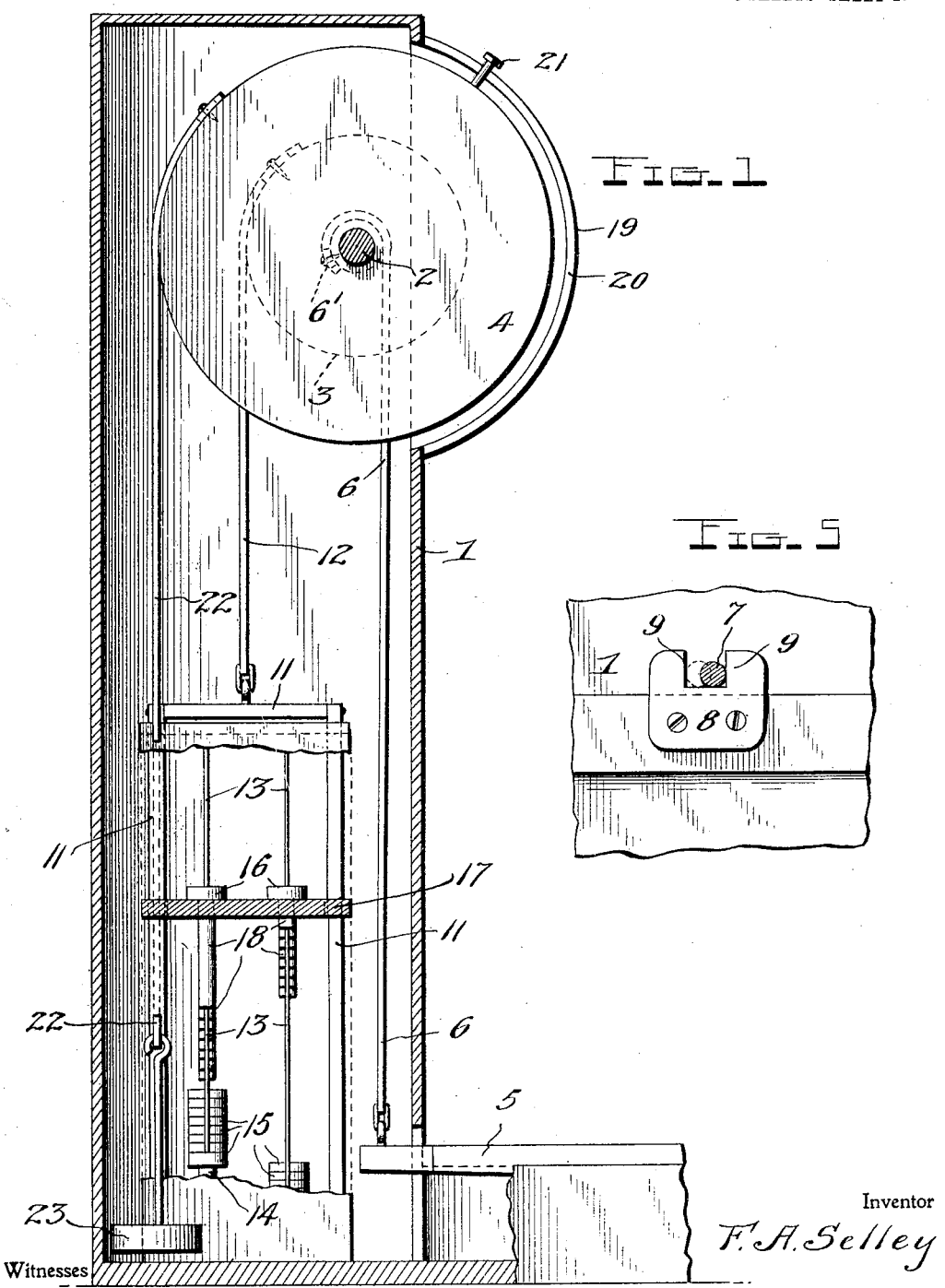

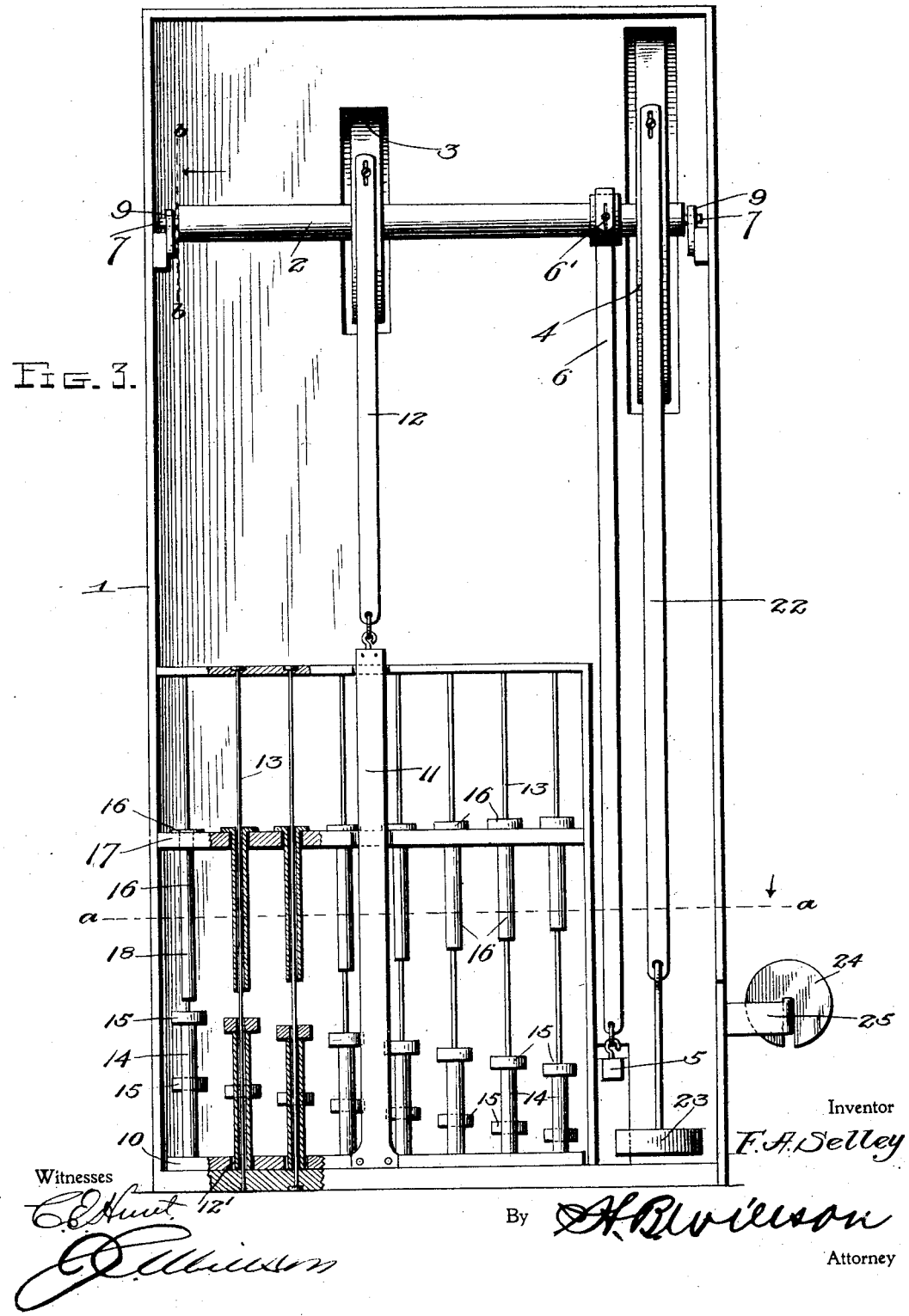

No. 751,018.	Patented February 2, 1904.

UNITED STATES PATENT OFFICE.

FREDERICK A. SELLEY, OF LAFAYETTE, TENNESSEE.

WEIGHING-SCALE.

SPECIFICATION forming part of Letters Patent No. 751,018, dated February 2, 1904.

Application filed June 29, 1903. Serial No. 163,595. (No model.)

*To all whom it may concern:*

Be it known that I, FREDERICK AUGUST SELLEY, a citizen of the United States, residing at Lafayette, in the county of Macon and State of Tennessee, have invented certain new and useful Improvements in Weighing-Scales; and I do declare the following to be a full, clear, and exact description of the invention, such as will enable others skilled in the art to which it appertains to make and use the same.

My invention is an improved weighing-scale; and it consists in the construction and combination of devices hereinafter described and claimed.

The object of my invention is to provide an improved scale which will indicate the successive weights of material placed thereon as the said material accumulates, and hence facilitate the weighing of such material.

In the accompanying drawings, Figure 1 is a vertical sectional view of a scale embodying my improvements. Fig. 2 is a horizontal sectional view of the same, taken on the plane indicated by the line *a a* of Fig. 1. Fig. 3 is a rear elevation of the same with the rear side of the casing removed to disclose the interior mechanism. Figs. 4 and 5 are detail views.

In the embodiment of my invention here shown there is an upright casing 1, in which at a suitable elevation is mounted an axle 2, provided with wheels 3 4 of appropriate size. A platform 5, which may be of any suitable construction, is connected, by a strap or cord 6, which in practice may be made of any suitable material, to the axle, as at 6', the said cord being adapted to be partly wound upon and paid out from the axle. The point 6', where the said cord is attached to the axle, is, in effect, a wheel upon the axle, the diameter of which may be varied according to the proportions of the wheels 3 4. The axle, with its wheels, constitutes, in effect, a balancing element adapted to be moved by the weights and by the weight of the material being weighed.

In order to reduce friction, render the scale very sensitive, and enable the axle to be freely turned, I provide the axle at its ends with spindles 7 of suitable diameter, which spindles bear upon the straight horizontal upper edges of supporting-plates 8, which, together with the spindles, are preferably made of iron or steel. This enables the axle to roll on its bearings, so that the axle moves laterally a slight distance while being turned in either direction, and at the limits of the lateral movement of the axle I provide stops 9, which are here shown as lugs that are formed integral with the bearing-plates 8.

A follower 10, which is the element that is moved by the weight of the material on the platform, is here shown as provided with an upwardly-extending bail or yoke 11, which is connected, by means of a cord 12, similar to the cord 6, hereinbefore described, to the wheel 3 of the axle. This follower is provided with a series of openings 12'. In the lower portion of the casing 1 is a plurality of vertically-disposed guide elements 13, which are here shown as wires. On the lower portions of the said wires or guide elements are supporting elements 14, which are here shown as tubes, which differ in height progressively, so that the upper end of each tube is at a higher level than that of the next tube in descending series. These tubes serve to support weights 15, which are slidable vertically on the guide-wires 13 and are each of the same weight, the said weights being weight-unit elements, as ounces, pounds, or the like, according to the kind and desired capacity of the scale.

In the embodiment of my invention here shown the scale is adapted for weighing two pounds, and each of the weights or weight units 15 represents an ounce, there being sixteen of the said weights or weight units here shown in the lower series, representing one pound. It will be understood that the supporting-tubes 14 serve to support the said weights at different elevations, so that as the follower 10 rises when material is placed on the platform the said follower progressively lifts the weights in succession and continues to thus accumulate and lift the weights until the sum of their weight is exactly equal to that of the material on the platform. Hence as material, such as sugar or the like, is poured upon the platform the follower 10 begins to rise as soon as the material begins to accumulate on the platform, and this movement of the follower continues while the material is being added to the platform, said follower progressively lifting and accumulating a number of the weights during its movements, as will be understood. Hence it is only necessary to provide the scale with means to indicate the sum of the resistance of the unit-weight elements to the movement of the element 10 to enable the person weighing the material to keep informed of the weight of the material placed by him on the platform until the desired quantity is there accumulated, hence greatly facilitating the weighing of material, as will be understood. Such an indicating means is hereinafter described.

The weight units are arranged in a plurality of series, which may be indefinitely extended, according to the desired capacity of the scale. The weight units of the primary series are indicated by the reference-numeral 15. In the embodiment of my invention here shown the weight units of the secondary series, constituting the second pound, are indicated by the reference-numeral 16. These secondary weight units are here shown as supported by a plate 17, through which the guide-wires extend. Each of the weights of the secondary series is here shown as provided with a depending tubular stem 18 to enable it to slide vertically on one of the guide-wires, and the said stems of the said secondary series of weights or weight units vary in length progressively and are arranged in reverse order with reference to the supports 14 for the lower or primary series of weight units. Hence after the primary series of weight units have been progressively accumulated and lifted by the movement upwardly of the follower 10 if the said follower continues to be raised by the weight of the material on the platform it will be caused to progressively accumulate and lift the weights of the secondary series also, as will be understood. The number of series of weights may, as hereinbefore indicated, be increased at will, according to the desired capacity of the scale.

I will now describe an indicating mechanism by means of which the weight of material on the platform at any time while the same is being placed thereon may be ascertained.

A segmental scale 19, the subdivisions of which correspond with the weight units hereinbefore described, is placed on the front side of the casing 1 and disposed concentrically with reference to the wheel 4. Said scale 19 has a slot 20, in which operates an indicating-hand 21, which is carried by the said wheel 4 and which sweeps over the scale 19. It will be understood that the position of the said hand on the said scale will correspond with the sum of the weight units raised by the follower 10 and that the said sum will be equal to the weight of the material on the platform. To enable the scale to be used for weighing material beyond the capacity of the successively-effective weight units, hereinbefore described, I provide a cord 22, the upper end of which is attached to the periphery of the wheel 4. In practice such cord may, like the cords 6 12, hereinbefore described, be made of any suitable material or may be a chain, strap, or the like. To the lower end of the said cord is attached a balance-weight 23, the function of which is to exactly counterbalance the platform 5 or scale-pan, as the case may be, and the said counterbalancing-weight 23 serves to support weights 24, any desired number of which may be placed thereon as may be required. The weights 24 are here shown as carried by the weight-holding device 25 on one side of the casing 1.

From the foregoing description, taken in connection with the accompanying drawings, the construction and operation of the invention will be readily understood without requiring a more extended explanation.

Having thus fully described my invention, what I claim as new, and desire to secure by Letters Patent, is—

1. In a weighing-scale, the combination of a platform, an axle having wheels, a cord connecting the platform to one wheel of the axle, a follower, a cord connecting it to one of the wheels of the axle, and a series of weights disposed at different elevations in the path of the follower and successively taken up thereby as the follower ascends, substantially as described.

2. In a weighing-scale, the combination of a platform, an axle having wheels, a cord connecting the platform to one wheel of the axle, a follower, a cord connecting it to one of the wheels of the axle, a series of weights disposed at different elevations in the path of the follower and successively taken up thereby as the follower ascends, a weight to balance the platform, and a cord suspending said weight from a wheel of the axle, substantially as described.

3. In a weighing-scale, the combination of a follower and means to raise it, with a series of upright guides, a series of primary weights engaging the guides, supported at different elevations and successively accumulated by the upward movement of the follower, and a series of elevated secondary weights, engaging the guides, and arranged in reverse order to the primary weights and having depending devices, successively engaged by the primary weights as they are lifted by the follower.

4. In a weighing-scale, the combination of a follower and means to raise it, with a series of upright guides, a series of primary weights, traveling on said guides, supports to normally maintain the weights at different elevations, an elevated support, a series of secondary weights normally thereon and having depending tubular stems, on the guides, varying in length and arranged in reverse order with reference to the primary weights, the latter being successively accumulated and lifted by the follower as it rises, and the tubular stems of the secondary weights being successively engaged and lifted, by the said primary weights as they continue to rise with the follower.

In testimony whereof I have hereunto set my hand in presence of two subscribing witnesses.

F. A. SELLEY.

Witnesses:
BENJ. G. COWL,
J. C. WILLSON.